United States Patent
Wallentin et al.

(10) Patent No.: US 7,453,847 B2
(45) Date of Patent: Nov. 18, 2008

(54) METHOD AND ARRANGEMENT FOR CHANNEL TYPE SWITCHING

(75) Inventors: Pontus Wallentin, Linköping (SE); Niclas Wiberg, Linköping (SE); Eva Englund, Linköping (SE); Per Magnusson, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 599 days.

(21) Appl. No.: 10/491,879

(22) PCT Filed: Oct. 19, 2001

(86) PCT No.: PCT/SE01/02302

§ 371 (c)(1),
(2), (4) Date: Aug. 30, 2004

(87) PCT Pub. No.: WO03/034771

PCT Pub. Date: Apr. 24, 2003

(65) Prior Publication Data

US 2005/0013287 A1    Jan. 20, 2005

(51) Int. Cl.
*H04Q 7/00* (2006.01)
(52) U.S. Cl. .................. 370/329; 370/352; 370/389; 455/453
(58) Field of Classification Search .......... 370/329, 370/335, 352, 389, 395.1; 455/450, 452.1, 455/453
See application file for complete search history.

(56) References Cited

U.S. PATENT DOCUMENTS

| 6,097,700 A * | 8/2000 | Thornberg et al. | 370/233 |
| 6,347,091 B1 * | 2/2002 | Wallentin et al. | 370/437 |
| 2004/0120253 A1 * | 6/2004 | Forssell et al. | 370/230 |

FOREIGN PATENT DOCUMENTS

| EP | 0993148 A2 | 4/2000 |
| WO | WO 0176304 A1 | 10/2001 |

* cited by examiner

*Primary Examiner*—Temica M Beamer
(74) *Attorney, Agent, or Firm*—Roger S. Burleigh (57) ABSTRACT

The present invention relates to a method for improved and efficient usage of radio network resources with regard to the transmission properties of applied communication channel types and total network load by means of using early indications on the uplink or downlink of requests to establish new communication connection or adjust parameter settings of already existing connections regading the expectable amount of additional traffic due to such a connection. Early indications are, e.g., information on protocol type, the kind of requested communication service, the profile of the user equipment that has sent the request, or traffic history. In response to such indications the inventive method can forward, e.g., an uplink request and at the same time initiate a channel type switching providing appropriate channel parameter settings or adjustments. In case of congestion control it is another possibility to delay or even suppress uplink requests.

16 Claims, 6 Drawing Sheets

METHOD AND ARRANGEMENT FOR CHANNEL TYPE SWITCHING

FIELD OF THE INVENTION

The present invention relates to a method for improved and efficient usage of radio network resources with regard to the transmission properties of applied communication channel types and the total network load.

BACKGROUND OF THE INVENTION

Modern radio communication systems are developed to be able to support various kinds of network services to end users. Apart from ordinary speech connections such services can relate to, e.g., the transfer of video data or the download of portions of packet data. Apparently, this requires a radio communication network that is prepared to handle communication connections for carrying traffic with considerably different characteristics. Said traffic can be distinguished, e.g. by means of the required transmission properties, e.g. bandwidth, delays, or bit error rates; the main traffic direction, i.e. bidirectional or mainly asymmetric; or the traffic density, i.e. whether the traffic flow is more or less constant or occurs in bursts. Four types of traffic classes have been defined for the UTRAN environment with respect to requirements on, e.g., delay, delay variations, or packet loss: The traffic class "conversational" requires typically short delays, a minimum of delay variation, and in-sequence delivery but a moderate packet loss. Examples of applications are bi-directional person-to-person communication such as voice or video telephony and games. Another traffic class, "streaming", requires moderate delays, a minimum of delay variations, in-sequence delivery but low to moderate packet loss. Examples of applications are unidirectional communication to humans, e.g. real-time audio and video streaming. A third traffic class "interactive" denotes typically information transfer from a server to a human or computer, e.g. Internet-related exchange of information, and requires reasonable low delay and low packet loss. Finally, a fourth traffic class denotes "background" traffic that relates to, e.g., the transfer of e-mail, files, or short messages and requires low packet loss but used for services that can accept longer delay and high delay variations.

In third generation cellular mobile communication systems, e.g. WCDMA-based communication systems, a number of radio channels with different characteristics have been defined in order to be able to handle traffic that is characterised by such various requirements:

A common channel is common to a number of user equipments, typically to all or a part of the user equipments in a cell. When using these types of channels, each data block that is sent on the channel needs to contain some kind of identity of the source and destination user equipment. Due to their limited capacity these channels are preferably used for the transmission of small portions of packet data. Another characteristic of the common channel is that the power on the uplink is controlled in a slow way and fixed for the downlink common channels. Examples of common channels in WCDMA for the uplink are the Physical Random Access Channel (PRACH) and the Physical Common Packet Channel (PCPCH). An example of a common channel on the downlink for a WCDMA-system is the Secondary Common Control Physical Channel (SCCPCH).

A dedicated channel is assigned exclusively to one user equipment and may be used by only this user equipment. This channel provides fast power control and soft handover. Dedicated channels are associated with a maximum bit rate, which is assigned when the channel is established. The transmitter may then use different sizes of transmitted blocks up to an allowed maximum value in order to accomplish a variable bit-rate channel but the assigned codes can not be used by other users when there is less to transmit than the maximum rate. An example of a dedicated channel in a WCDMA-system is the Dedicated Physical Channel (DPCH), which is a bi-directional channel.

A shared channel is shared by a set of user equipments in a cell. However, instead of identifying each transmitted block with the mobile identity, as done for common channels, the information on which blocks are used by which user equipment is provided separately, i.e. such as done on an associated DPCH to each user equipment. A scheduling function decides for which user equipment the data is sent. These channels provide a variable bitrate for each user but still uses the codes efficiently. Examples of shared channels in WCDMA-systems are the Physical Downlink Shared Channel (PDSCH) and the Physical Uplink Shared Channel (PUSCH).

Each type of channel provides a unique set of characteristics and, regarding the fact that a variety of services must be provided to the user equipments, it becomes obvious that there is not one single channel type that is optimal at every point in time and for each type of service. Therefore, it is necessary that there are control functions to select which channel type or types should be used by each user equipment at each point in time.

In WCDMA-systems, a prior known solution for this requirement is the introduction of a function for traffic volume measurement that is implemented in the Radio Network Controller (RNC) as well as in the Medium Access Control (MAC) sublayer of the user equipment. The MAC performs a scheduling of data transmission on the radio channel. For these reasons, the MAC continuously polls the data buffers in the Radio Link Control (RLC) sublayer for any data to transmit. When there is data in the buffers, the MAC takes data from the RLC-buffers and schedules the transmission of the data on the radio channel. The traffic volume measurement function in the MAC checks the amount of data in the RLC-buffers. When the total amount of data in the RLC-buffers, e.g., exceeds a limit controlled by the network, a measurement report message, which includes inter alia information about the amount of data in the buffers, is sent to the network. The network on the other hand monitors the traffic volume in a similar way, but the measurement report message is generated internally in the Radio Network Controller. The results from the traffic volume measurement function in the RNC and the received measurement reports from the mobile station are fed into a "channel type switching function" in the RNC. This function may order the connection to a mobile station to switch from a certain combination of channel types, e.g. the PRACH and the SCCPCH, to another combination, e.g. the DPCH.

WO 99/66748 discloses a method and apparatus for dynamically adapting a connection state in a mobile communication system. A packet data connection between a mobile station and a radio access network is established where the state of the connection is used to specify one of plural different types of radio channels. The connection is dynamically adapted to an optimal state based on one or more conditions relating to the connection.

Figure 1A:
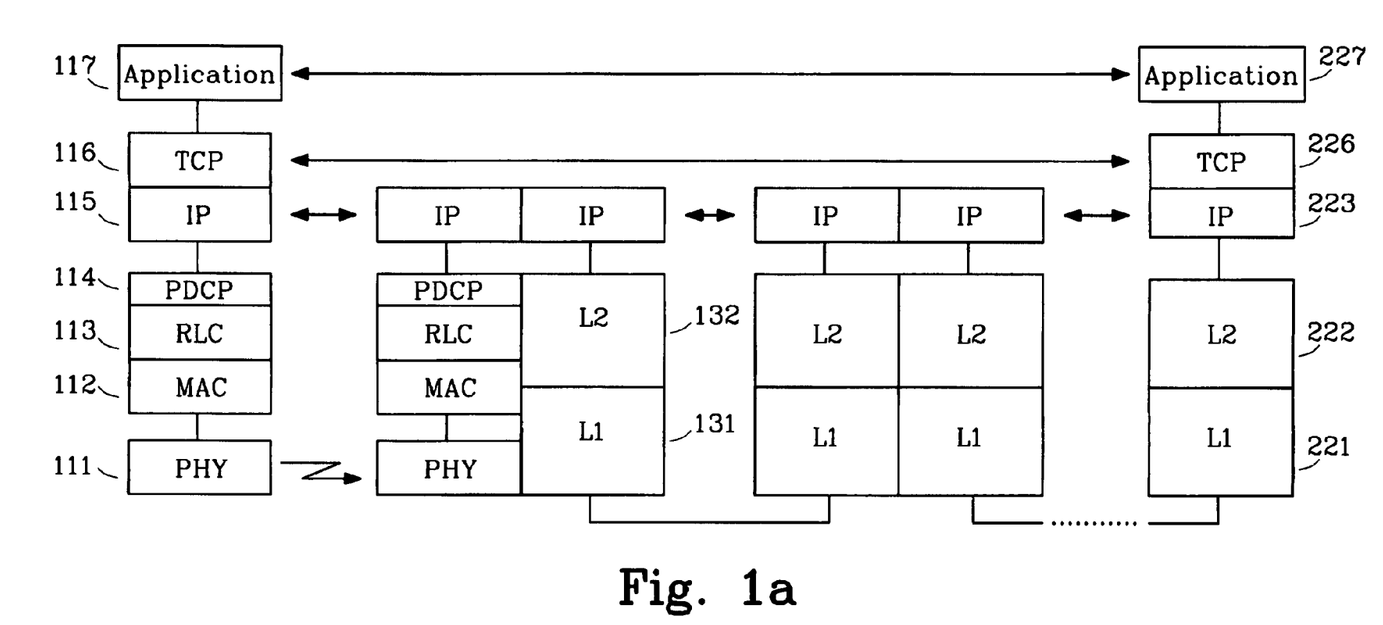
FIG. 1a shows an overview of a layered protocol structure of units in a communication system as presented in FIG. 1b.
Figure 1B:
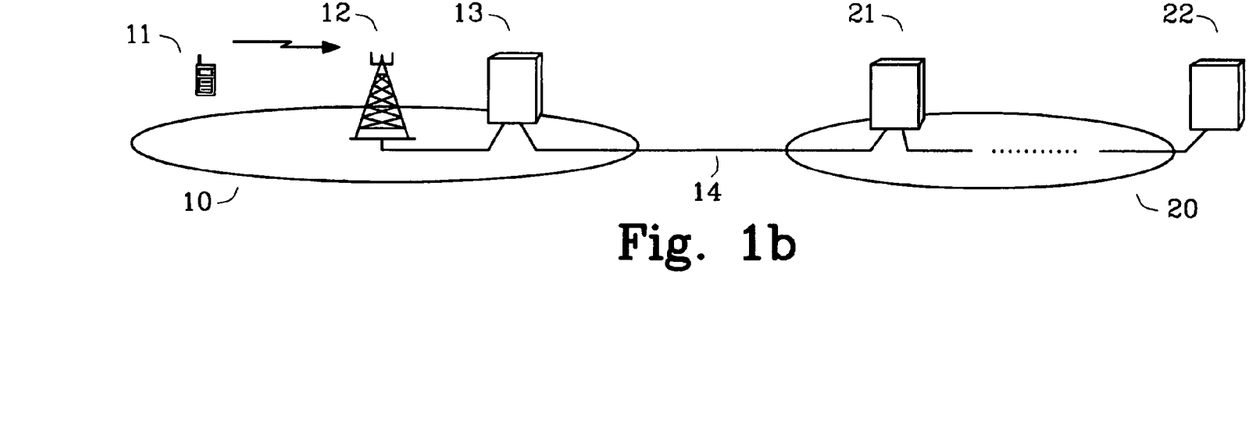
FIG. 1b shows a communication system consisting of a radio communication system and a packet data network.

FIG. 1a shows an overview of a layered protocol structure of units in a communication system as presented in FIG. 1b. The description of methods for channel switching according to the state of the art and according the present invention will rely upon these figures. This communication system consists of a mobile radio communication system 10 and a packet-switched network 20, e.g. the Internet. The radio communication system 10 is intended to provide services to a plurality of user equipments 11 that roam within its coverage area. Said user equipments 11 are connected to one or more radio base station 12, which are controlled by Radio Network Controllers (RNC) 13. The Radio Network Controller 13 is responsible for a variety of tasks related to the handling of communication traffic and system maintenance and provides also connections 14 to other networks, e.g. a packet-based network 20 that consists of a plurality of interconnected units 21,22 such that user equipments 11 in the radio communication network 10 can retrieve information from a remote unit 22 in said packet data network 20. The user equipment 11 performs an application protocol 117 on top of a layered protocol structure that uses, e.g., TCP (Transmission Control Protocol) 116 or another appropriate protocol on top of IP (Internet Protocol) 115. These protocols rely in turn on, e.g., PDCP (Packet Data Convergence Protocol) 114, which performs a compression of the TCP/IP-headers to reduce the packet sizes sent over the radio interface, RLC (Radio Link Control) 113, and MAC (Medium Access Control) 112. Finally, the physical layer 111 is responsible for the physical data exchange on the radio channel. The RNC 13 provides a corresponding protocol stack in order to be able to handle the forwarding of IP-packets. The RNC 13 is also capable to perform the necessary protocols on the physical layer (L1) 131 and the link layer (L2) 132 for handling IP-packets in the packet data network 20. Finally, apart from the appropriate layer 1 and layer 2 protocols and IP 223 the remote unit 22 in the packet data network to which the user equipment 11 intends to establish a connection must be equipped with TCP 226 and the application protocol 227 that corresponds to the application protocol 117 in the user equipment.

Figure 2A:
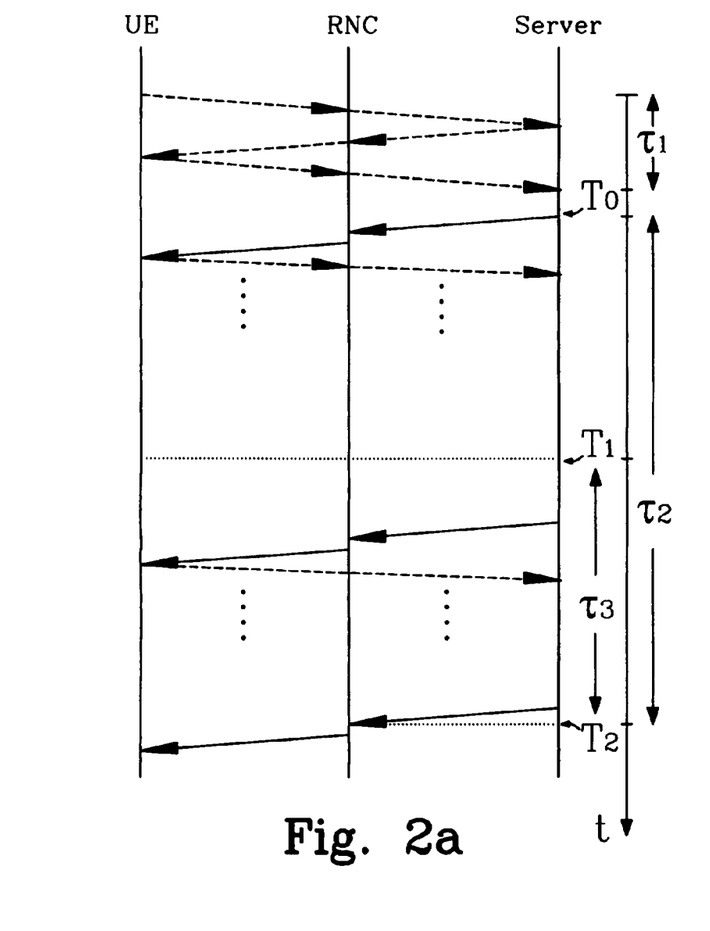
FIG. 2a shows a time flow diagram for the establishment of an appropriate connection for information download from a remote unit in a packet data network to a user equipment in a radio access network when using the method according to the state of the art.

FIG. 2a shows a time flow diagram for the establishment of a connection according to the state of the art that shall be applied for information download, e.g. web browsing, from a remote unit in a packet data network to a user equipment in a radio access network. The application uses HTTP (Hypertext Transfer Protocol) to fetch webpages, which layout is described in HTML (Hypertext Markup Language), from a web server. HTTP in turn uses TCP on top of IP for data transmission. For each HTML-page, or sometimes even for each object on the HTML-page, a TCP-connection is established and then the bursts of data are transmitted from the web server to the web browser in the user equipment. This data exchange can be subdivided into three phases: In the first phase, a TCP-connection is established by means of sending a TCP-segment comprising a SYN-flag in its header field from the user equipment to the web server through the radio communication system and the packet data network. The web server then acknowledges the establishment of the TCP-connection by means of sending a TCP-segment comprising an ACK-flag it its header field back to the user equipment whereupon also the user equipment acknowledges by means of sending a TCP-segment comprising an ACK-flag. This establishment of a connection implies a delay time $\tau 1$. Then, in a next phase the content of the HTML-page is sent in TCP-segments from the web server. On its way to the user equipment they pass the mobile system where they are buffered and wait to be scheduled for transmission over the radio interface by the MAC. At a point T1 in time when the traffic volume measurement function detects that the amount of data in the RLC-buffers in the mobile system exceed a certain threshold value, it informs the "channel type switching function", which triggers a change of the channel type. At a point T2 in time after a delay period $\tau 3$ the channel switching is completed. There is thus a certain delay $_{\tau 2}$ between the point T0 in time when the information download to the user equipment is started and the point T2 in time when an appropriate channel type is available for said information download. During said delay period $\tau 2$ the user will experience a slow response from the external server and a low data throughput.

SUMMARY OF THE INVENTION

A shortcoming of the prior-art solution as presented above results from the fact that the channel type selection and the channel parameter settings are triggered by traffic volume measurement reports. This leads on the one hand to comparatively long delays to establish a new type of channel when bursts of data need to be transmitted and, on the other hand, to take measures in case of a reported upcoming network congestion situation. These long delays result in low throughputs in terms of the transmitted data rate, e.g. due to an inappropriate channel type or network congestion, and are experienced by the end user as a slow response.

Therefore, it is an object of the present invention to achieve a method that provides an efficient usage of the radio network resources with regard to the transmission properties of the applied communication channel types and the total network load.

It is thus an object of the present invention to achieve a method for channel type switching in radio communication networks that provides in an early stage an efficient and fast downlink connection.

It is thus another object of the present invention to achieve a method that initiates in an early stage measures to prevent a reported upcoming network congestion.

Briefly, the method according to the present invention accomplishes these objects by means of using early indications of requests to establish a new communication connection or adjust parameter settings of an already existing connection that are sent on the uplink or downlink regarding the expectable amount of additional traffic due to such a connection. Such early indications can be retrieved from information on protocol type or protocol contents, the kind of requested communication service, the profile of the user equipment that has sent the request, or traffic history. In response to such indications the inventive method can forward, e.g., an uplink request and at the same time initiate a channel type switching providing appropriate channel parameter settings or adjustments. In case of congestion control measures it is yet another possibility to delay or even suppress the uplink request. By this means, the method according to the present invention rather prevents than reacts on an inefficient usage of channel or network resources.

It is a first advantage of the present invention that there is a shorter latency before data can be transmitted at a higher average throughput, which results in shorter response and download times.

It is another advantage of the present invention that a lesser number of RLC-buffers is needed because data is sent faster, which also implies a lower memory demand in the user equipment.

It is still another advantage of the present invention that a lesser number of measurement reports need to be sent from the mobile station since the channel type switching is triggered earlier, thus resulting in less signalling traffic.

Yet another advantage of the present invention is that it implies a simple solution with a minimum of complexity and with minimal impact on the system architecture.

Other objects, advantages and novel features of the invention will become apparent from the following detailed description of the invention when considered in conjunction with the accompanying drawings and claims.

BRIEF DESCRIPTION OF THE DRAWINGS

For a better understanding, reference is made to the following drawings and preferred embodiments of the invention.

DETAILED DESCRIPTION

The method according to the present invention is performed, e.g., in or at the site of the Radio Network Controller (RNC) 13 in a WCDMA-system 10. It is one principal idea of the inventive method to predict expectable downlink traffic in the radio communication network 10 as early as possible by help of early indications that are sent via the Radio Network Controller 13 on the uplink, e.g. regarding the protocol type or protocol contents and the kind of requested service for a new downlink communication connection, the user profile, or traffic history. By this means a channel switching to an appropriate downlink channel can be performed as early as possible, i.e. in parallel to the establishment of the downlink communication connection between a remote unit 22 and the user equipment 11. Similarly, said method can also be used to free a dedicated downlink channel as soon as possible by using early indications for a connection termination which are received on the uplink or downlink. Early indications on the uplink or downlink can also be used for a congestion control in the radio communication network 10 by means of reducing or delaying the traffic amount that is sent on the uplink or downlink. This reduction can be achieved either by suppressing or delaying, e.g., an uplink request, which prevents, at least temporarily, the generation of additional downlink traffic, or by reducing the assigned downlink bitrates.

Figure 3A:
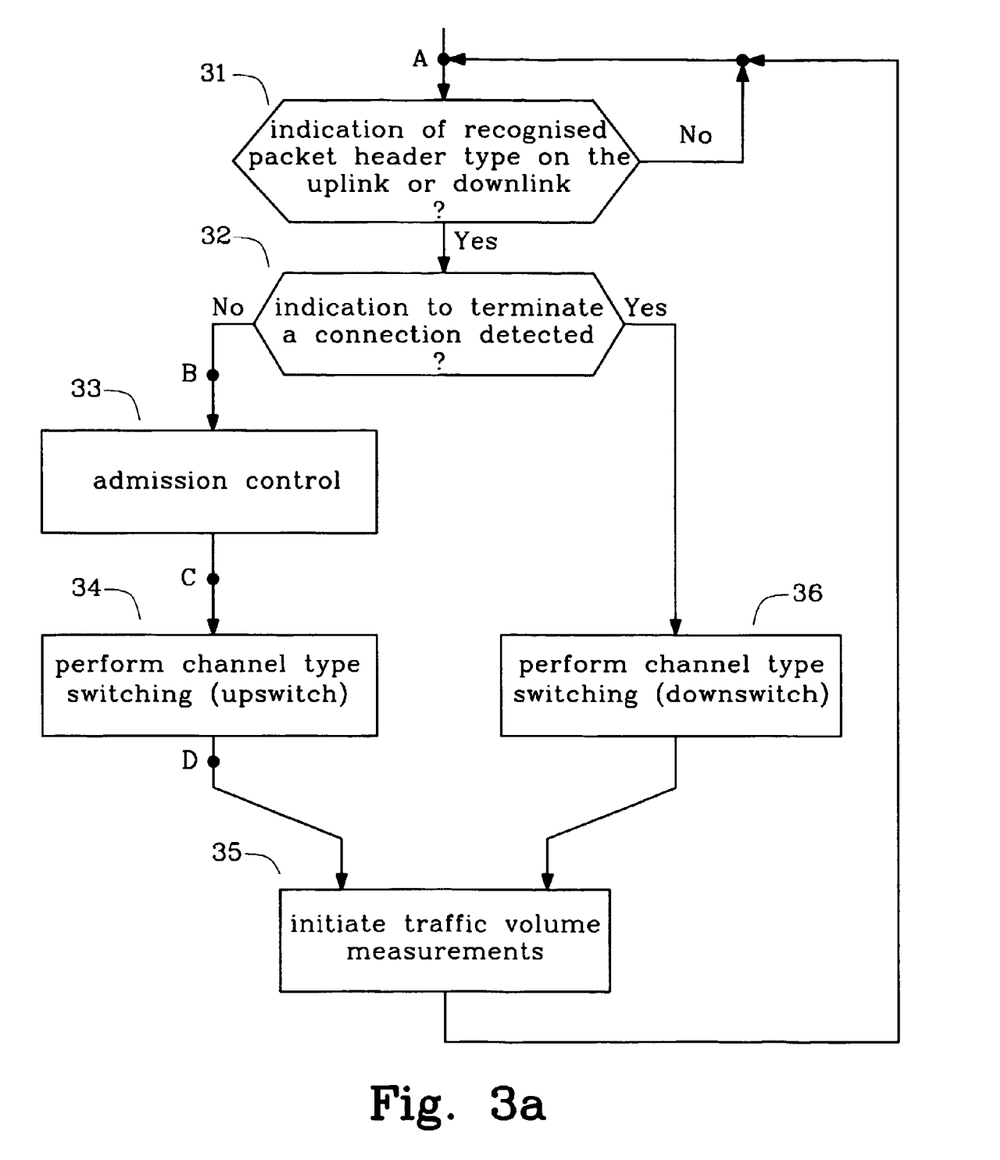
FIG. 3a shows a flowchart that illustrates an overview of the method steps of the present invention.
Figure 3B:
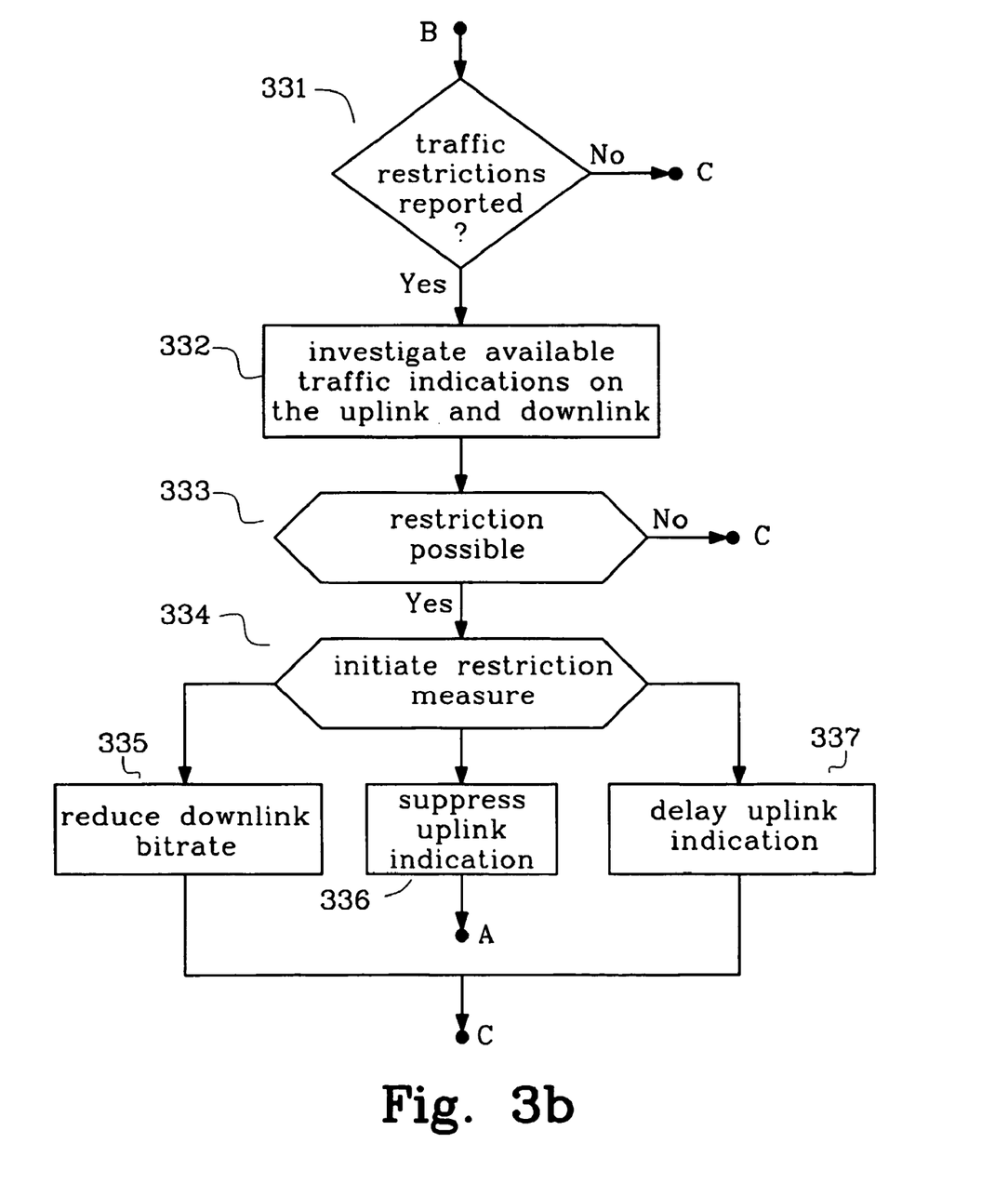
FIG. 3b shows a flowchart that illustrates the method steps for adapting to possible traffic restrictions according to an alternative embodiment of the present invention.
Figure 3C:
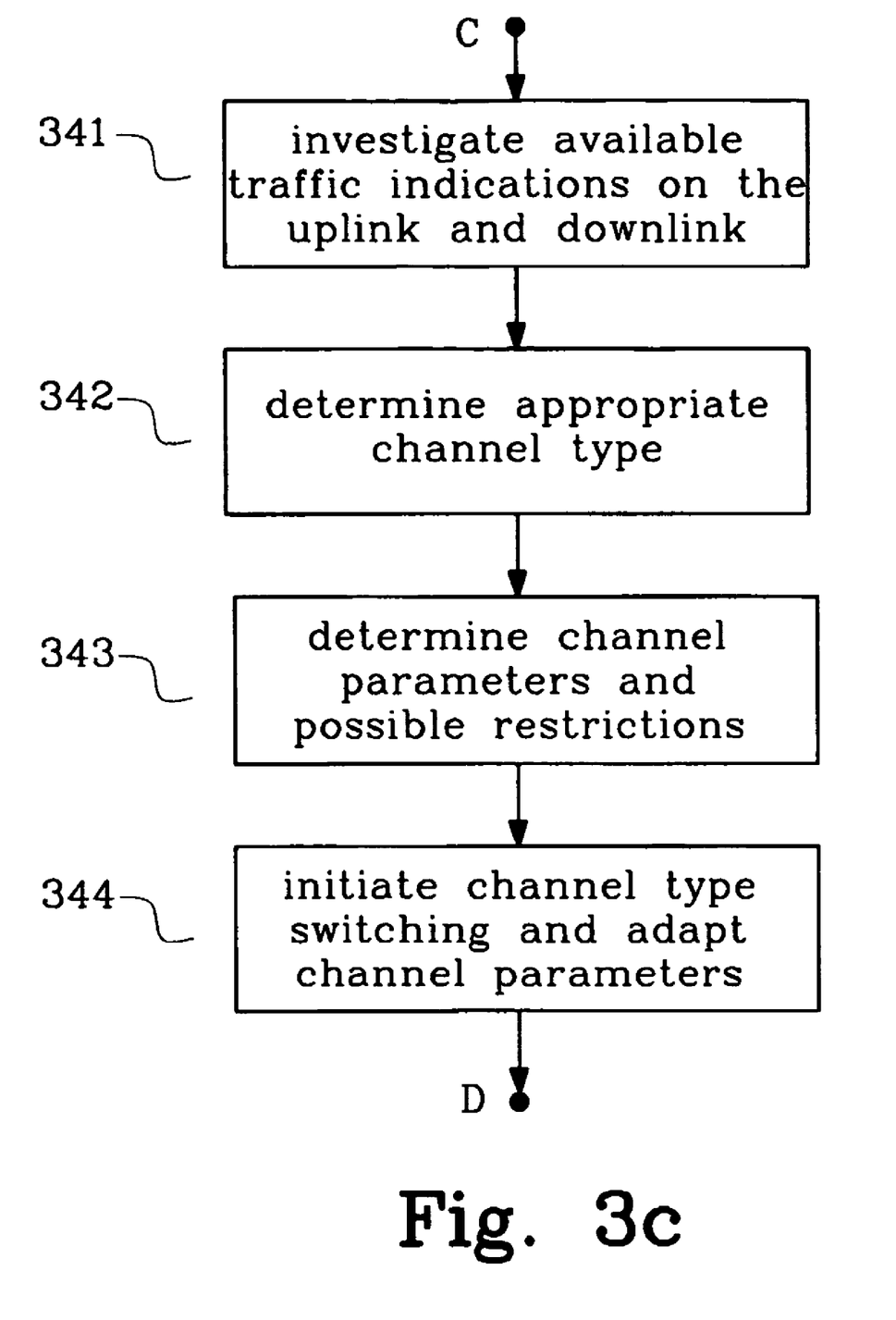
FIG. 3c shows a flowchart that illustrates the method steps for performing the channel type switching according to the present invention.

The flowcharts of FIGS. 3a-3c will present the method according to the present invention, which is applied for a channel type switching in order to reduce delay times on downlink communication connections. While FIG. 3a presents the method steps in an overview flowchart, FIG. 3b shows in particular the method steps for adapting to reported traffic restrictions according to an alternative embodiment of the present invention and FIG. 3c shows the method steps for performing the channel type switching.

FIG. 3a describes the overall method steps that are performed to achieve a faster switching to an appropriate downlink channel as performed by a functional unit, e.g., incorporated in the Radio Network Controller: The method checks for indications of data packets that are sent on the uplink, e.g. from a user equipment in the radio communication network, to the RNC, or sent on the downlink to said user equipment, block 31. These indications can be retrieved from, e.g., the Packet Data Convergence Protocol (PDCP) that reads all throughpassing data packets for performing a compression of header fields in order to reduce the packet sizes that must be sent over the radio interface. However, within the scope of the present invention it is likewise possible to retrieve this information by other means. Said indications relate inter alia to the protocol type, e.g. TCP or HTTP, but also to possible flags that indicate, e.g. a request for establishing a communication connection for carrying a certain type of traffic or an indication to terminate a connection. Generally, the method according to the present invention allows to use the content of received data packets, e.g. the header field, sent in either uplink or downlink direction in order to make predictions of the expectable traffic on the uplink or downlink. If an indication of a recognised data packet type has been received on the uplink, block 31 Yes, it is investigated whether this header field belongs to a data packet sequence or segment that contains an indication to terminate a connection, block 32 Yes, or contains other kind of traffic indication, block 32 No, e.g., an indication on the uplink to establish a new downlink communication connection. Examples of detectable flags that indicate the establishment of a new downlink communication connection are, e.g., a TCP SYN-command for establishment of a new TCP-connection, a HTTP GET-command, or a RSVP Reserve command. For these cases the method according to the present invention can provide for at least one of the following measures: In a first step, block 33, an admission control part can check whether any traffic restrictions have been reported from the network, e.g. due to a near congestion state in the network, and determine in which way such possible restrictions should have an influence on the establishment of an additional downlink connection as requested by the detected uplink command. This will be explained in greater detail in FIG. 3b. In another step, block 34, the method step will initiate the necessary steps for performing a downlink channel type switching. This will be explained in greater detail in FIG. 3c. Thus, a channel type switching and/or measures for a possibly necessary downlink traffic reduction are triggered directly by the detection of, e.g., a protocol flag or a comparable indication on the uplink preceding to a new downlink connection. It is important to stress that these measures are initiated before the corresponding downlink connection has been established, i.e. in parallel to said connection establishment. Apparently, the inventive method offers the advantages to establish a downlink connection for which the initial data transfer is experienced to be faster compared with the state-of-the-art solution while at the same time also considering the total network load. The merits of the invention will mainly depend on the fact how well the presumptions that lead to a channel switching correspond to the actual data transfer. After the establishment of a new channel type or the introduction of traffic restrictions traffic volume measurements can be initiated, block 35, that result in reports that may trigger further channel switchings and/or adjustments of the channel parameters.

A similar problem as to initiate a channel switching as fast as possible in the beginning phase of the establishment of a new communication connection is to release a connection as fast as possible after that it has been terminated in order to free radio resources that are no longer used for other tasks. Therefore, if an indication to terminate a downlink connection is received on the uplink, block 32 Yes, the part of the downlink connection in the radio communication network can already be freed at that point, block 36, instead of waiting until the external remote unit from which information has been retrieved has terminated the downlink connection. Still another conceivable alternative, which is not shown in the figure, could be to check the downlink connections for indications to terminate such a connection.

The efficiency of the method according to the present invention depends to a conceivable degree on the quality of the decision to switch to a certain type of channel comprising certain channel parameter settings with regard to the expected traffic and, in case of reported traffic restrictions, to take the appropriate measures to prevent that a new established downlink connection makes a near network congestion situation even worse. The selection of an appropriate channel type and the channel parameter settings, e.g. the maximum bitrate, are a-priori decisions that are taken before any data has been sent. Therefore, in order to prepare appropriate measures to meet required traffic restrictions, block 33, or in order to select the appropriate channel type, block 34, for a new downlink connection, the method according to the present invention will in both cases investigate available traffic indications on the uplink regarding said downlink connection, block 332, block 341.

The following paragraph will therefore discuss a selection of possible indications that can be applied for these purposes by the method according to the present invention: Two major indications for an estimation of the expectable additional traffic on the uplink or downlink are the applied protocol type and the traffic class. The protocol type, e.g. TCP or HTTP, can provide indications, e.g., of the amount of traffic, the distribution in time or the main direction of the traffic flow. The method according to the present invention can be advantageously used for so called "interactive" or "background" traffic, which can be characterised as bursty and often asymmetric traffic. This implies that comparatively huge portions of traffic are sent in one direction at certain time periods while there is virtually no traffic during the intermediate time periods and only little traffic in the other direction. The indication of the traffic class has also an influence with regard to the available resources that, e.g., the network operator has reserved for traffic of the respective traffic class. In order to make more exact predictions of the expectable amount of traffic and allocate an appropriate channel type it might also be possible to apply, e.g., a TCP-proxy. Another indication can be retrieved from the subscription type of the user equipment that has sent the uplink indication or to which a downlink indication is sent. Depending on the fact whether the subscription type guarantees, e.g., a prime type service or only a best-effort service it is possible to determine the channel type selection and parameter settings and, if necessary, the severity of possible traffic restrictions. It is thus possible to favour certain user equipments regarding the accessibility to the network or the assigned channel bitrate. The selection of the maximum bit rate for a new channel can also be based on parameters that have been used when the radio access bearer between user equipment and core network was established. In addition to this, yet another conceivable indication can be retrieved from traffic statistics that is collected in a network unit, e.g. the Radio Network Controller. From this statistics information can be retrieved on the communication that is transmitted to a user equipment or retrieved from a remote unit, e.g., on the amount of transmitted data to a certain user equipment, the traffic behaviour of this data, e.g. bursty or asymmetric traffic, and the period of time for which a communication connection normally is used. Apparently, traffic indications within the scope of the present invention include aspects of traffic conditions, e.g. related to the applied protocol type and the kind or amount of data traffic, aspects related to network conditions or network operator preferences, e.g. the assigned resource shares for the various traffic classes, and finally aspects that relate to the user equipment that has requested for a communication connection, e.g. the user subscription type.

FIG. 3b shows the method steps to prepare appropriate admission control measures to meet possibly required traffic restrictions, block 33: By this means the inventive method can be used in order to achieve an improved congestion control in the radio communication network. In an air-interface congestion situation, e.g. due to a lack of downlink transmission power, the radio resource management function may be forced to reduce temporarily the bitrates for connections to some user equipments. This has an influence on the ongoing data flows and may cause an excessive buffering in the network, which leads to high delays and packet drops. If any traffic restrictions have been indicated, e.g., by the network, block 331 Yes, it is at first necessary to investigate the available traffic indications that have been received on the uplink or downlink, block 332, as explained in the paragraph above. From this retrieved information it must be decided whether traffic restrictions can be taken into account for the requested downlink connection, block 333, and which restrictions are applicable, block 334. These decisions can be defined in accordance with the strategy of the network operator, e.g., to guarantee a fast and reliable service to as many user equipments as possible in the network. If the radio network is in a near congestion state and thus reports a need for traffic restrictions the inventive method can be used to restrict or even suppress additional downlink traffic. The network operator may decide to introduce traffic restrictions for certain types of traffic, e.g. all traffic that is not real-time sensitive, or for certain user subscription types, e.g. a best-effort subscription type. If such or other restrictions appear to be applicable for the downlink connection that is to be established, block 333 Yes, it is up to the network operator to select an appropriate measure to put this restriction into practise, block 334. There are several possibilities to meet the requirement of a downlink traffic restriction: The most severe alternative is to suppress the uplink indication and by this means simply avoid any downlink traffic that would occur if the downlink connection is established, block 336. This alternative could be applied, e.g., for user equipments that have a low prioritised subscription type. A more modest alternative is to delay the uplink indication for a shorter time period, block 337, which could be applicable if the network reports shorter and temporary congestion peaks or if the network load is close but still below a certain congestion threshold level. Still another alternative is to modify the downlink channel parameters depending on the expected traffic or protocol type. This could imply that the downlink bitrate is maintained, e.g., for real-time sensitive traffic but selectively reduced, block 335, for other kinds of traffic. Apparently, the measures as described above are not only applicable to meet requests for traffic restrictions but can also be used by a network operator to favour, e.g., certain types of users or certain types of traffic.

Regarding the selection of a channel type, the establishment of a communication channel is normally initiated via a common channel, which is common to all user equipments in a cell or a part of a cell. However, as these channels have a limited capacity and slow power control they are badly suitable for transmission of larger data portions. Therefore, it is desirable to use a dedicated channel or a shared channel for the transmission of larger portions of data. Dedicated channels are exclusively assigned to a certain user equipment; however, there is only a limited number of such channels, which probably are not efficiently used in case of bursty and/or asymmetric traffic, which are characteristics of interactive or background traffic that the present invention focuses on. Shared channels can be used by several user equipments in a cell and comprise a variable bit rate for each user. These channels are well suitable for, e.g., interactive or background traffic. After the establishment of the new channel type, traffic measurement reports may be used to trigger a further channel type switching or to initiate adjustments of the maximum data rate. If, for instance, the maximum rate has been selected too low, the rate at which data can be transmitted is lower than the rate at which data is received from the upper layer. This can cause that the data buffers will exceed a defined threshold level and thus trigger a traffic volume measurement report. In this case it may be necessary to switch to a higher rate channel or a different channel type. On the other hand, if the maximum rate has been set unnecessarily high, the RLC-buffers are emptied and a traffic volume measurement function may report that there is no data to transmit. In this case, it may be necessary to switch to a lower rate channel or a different channel type.

FIG. 3c show the method steps to perform a channel type switching. As already described above it is necessary to investigate the available traffic indications that have been received on the uplink or downlink, block 341. From this information an appropriate channel type can be selected, block 342. The channel parameter setting including possible restrictions, block 343, depends on said traffic indications. The maximum channel bitrate or other parameters for the downlink channel that shall be established can be determined from traffic related aspects, e.g. the expectable amount of additional downlink traffic or the protocol type; from user related aspects, e.g. the user subscription type; or from network related aspects, e.g. the network resources that have been reserved for and are available for certain types of traffic or certain types of users. Said maximum bitrate can also be determined from the parameters used when the radio access bearer was established. Finally, the channel type switching and parameter setting is initiated on basis of the conclusions from these and other reported traffic indications, block 344.

Figure 2B:
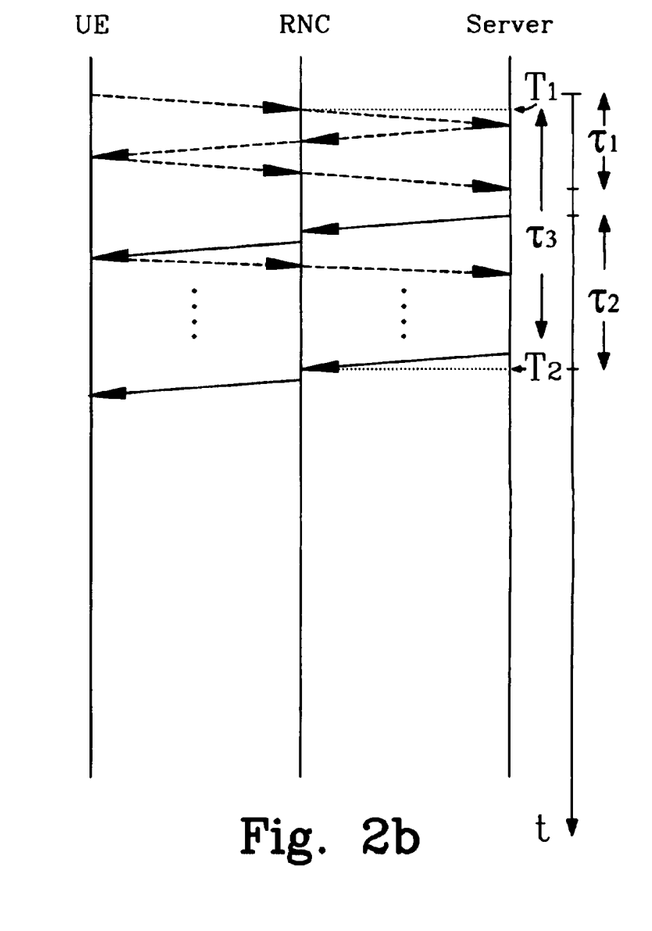
FIG. 2b shows a time flow diagram for the establishment of an appropriate connection for information download from a remote unit in a packet data network to a user equipment in a radio access network when using the method according to the present invention.

FIG. 2b describes in analogy to FIG. 2a a time flow diagram for the establishment of a connection that shall be applied for information download from a remote unit 22 in a packet data network 20 to a user equipment 11 in a radio access network 10. The time flow in this figure has been improved by help of the method according to the present invention. The comparison of FIGS. 2a and 2b will illustrate the merits of the invention regarding reduced response delays due to the faster establishment of an appropriate communication channel.

A user equipment (UE) in a radio access network that intends, e.g., to retrieve data from a remote unit in an external network by means of a TCP/IP-connection will send a TCP-header containing a SYN-flag to said remote unit via the RNC that controls the network part within which said user equipment is located. The remote unit will acknowledge the connection request by means of responding with a TCP-header containing an ACK-flag. This connection establishment will cause a certain delay $_{\tau 1}$ before any data actually is transmitted from the remote unit. It is now the idea of the present invention to initiate a switch to an appropriate channel type comprising an appropriate setting of transmission parameters already during the establishing phase, i.e. at a point in time $T_1$ when the RNC, e.g. via the PDCP, has received an indication on the uplink of the protocol and the type of traffic for which a downlink connection shall be established to a user equipment. The channel type switching implies a certain delay $_{\tau 3}$ after which the new channel can be applied. An apparent merit of the invention is that the time period $_{\tau 2}$ during which data is transmitted via a non-optimal channel is considerably shorter compared to the solution according to the state of the art.

In FIG. 2b the merits of the method according to the present invention are demonstrated by help of the example of user equipments that retrieve user-related data. Said data transfer is experienced to be faster in the initial phase. However, the inventive method can also be successfully applied for data retrieval that is not visible for the end user. This could typically be any kind of background traffic that is transmitted at irregular times and necessary for exchange of various control and signalling information. Another example is the download of software to the user equipment. This traffic is necessary on the one hand but implies on the other hand a decrease of the network capacity for user traffic. Therefore, it is advantageous to apply the method according to the present invention in order to be able to perform the data transfer faster and to free downlink channel that are used for such traffic as soon as possible when the data transmission has been completed.

Figure 4:
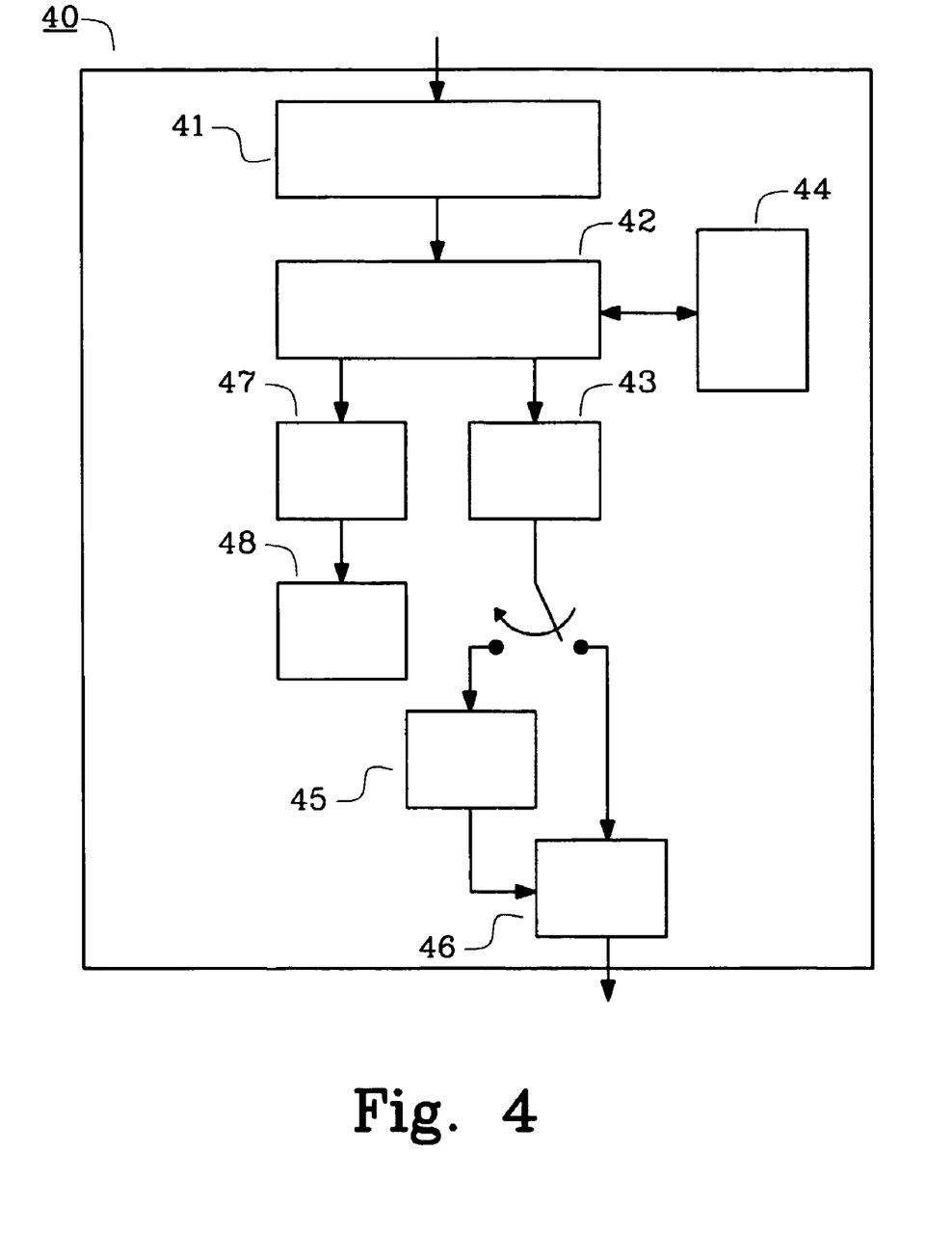
FIG. 4 shows an arrangement that is incorporated in or connected to a Radio Network Controller in order to perform the method according to the present invention.

FIG. 4 shows an arrangement 40 that is incorporated in or connected to a Radio Network Controller 13 in a radio communication system 10 in order to perform the method according to the present invention. Said arrangement 40 comprises means 41 for retrieving information of data packets that are sent on the uplink from said user equipments to one of the Radio Network Controllers. This information is checked by a unit 42 for a correspondence to one of a selection of known packet header types that is stored in a record field 44. The arrangement comprises means 43 for investigating recognised data packet headers containing a request to establish a communication connection. If a request to establish a connection has been detected the arrangement 40 can apply means 46 for performing a channel type switching to an appropriate channel type comprising appropriate channel parameter settings on basis of the traffic indications that have been received on the uplink in parallel to the further establishment of the communication connection. An optional unit 45 can be used to check for possible traffic restrictions that are reported, e.g., from the network. In this case, said unit 45 can initiate possible restriction measures for the communication connection to be established before a channel type switching is performed in unit 46. As already explained above, said restriction measures rely on traffic indications, e.g. related to the protocol type, that have been received on the uplink. Possible restriction measures are, e.g., to suppress or delay a received uplink data packet header containing a request to establish a new downlink communication connection or to reduce the bitrate for this new downlink communication connection. The arrangement 40 also comprises means 47 for investigating recognised data packet headers containing a request to terminate a communication connection. In case of a request to terminate a connection the arrangement 40 can apply a unit 48 that terminates the radio connection part of said existing communication connection.

Hitherto, the method and arrangement according to the present invention have been described with focus on a WCDMA-based radio communication system using a Radio Network Controller 13. However, it is notwithstanding possible to apply said invention also in other kinds of radio communication systems. The inventive method could also be applied together with other node types that are responsible for traffic control, e.g. between user equipments in said radio communication system and other remote units, and have an influence on the channel settings for communication connections between said units. Examples of such nodes are a Base Station Controller (BSC), a Packet Control Unit (PCU), or a Mobile Services Switching Centre (MSC). Still other examples of conceivable nodes are a Serving GPRS Support Node (SGSN) or a Gateway GPRS Support Node (GGSN), which provide inter alia support for packet switched services towards mobile stations, including mobility management, access control and control of packet data protocol contexts. In addition to this, the GGSN provides interworking with external packet-switched networks such as the public Internet.

The invention claimed is:

1. A method in a radio communication system for channel type switching, said system comprising at least one control node which is connected to a number of Radio Base Stations each covering certain geographical areas and providing communication services to user equipment in said areas and providing connections to remote units in external networks, said method comprising the steps of:
   retrieving information regarding data packets that are sent on the uplink from said user equipment or on the downlink from one of said remote units to one of said control nodes and checking for a correspondence to one of a selection of known packet header types;
   investigating recognized data packet headers in either direction for traffic indications in order to make predictions of the expectable traffic in consequence of said recognized data packet headers; and
   performing a channel type switching to an appropriate channel type comprising appropriate channel parameter settings on basis of said investigated traffic indications.

2. The method according to claim 1, wherein the channel type switching and parameter setting is performed for an already existing communication connection or in parallel to the establishment of a new communication connection on basis of traffic indications that have been received in the reverse direction.

3. The method according to claim 1, further comprising an admission control for a downlink communication connection to be established by means of checking reported traffic restrictions and initiating possible restriction measures on basis of traffic indications that have been received on the uplink.

4. The method according to claim 3, wherein a received uplink request is suppressed if the predicted additional downlink traffic exceeds a threshold value for the available downlink transmission resources.

5. The method according to claim 3, wherein a received uplink request is delayed if the predicted additional downlink traffic exceeds a threshold value for the available downlink resources.

6. The method according to claim 3, wherein downlink bitrates are reduced for traffic that is not realtime sensitive.

7. The method according to claims 1, wherein a first group of investigated traffic indications refer to a protocol type and a traffic class.

8. The method according to claim 1, wherein a first group of investigated traffic indications refer to protocol contents.

9. The method according to claim 1, wherein a second group of investigated traffic indications refer to the available radio network resources.

10. The method according to claim 1, wherein a third group of investigated traffic indications refer to properties of the user equipment and the user subscription type.

11. A method in a radio communication system for channel type switching, said system comprising at least one control node which is connected to a number of Radio Base Stations each covering certain geographical areas and providing communication services to user equipment in said areas and providing connections to remote units in external networks, said method comprising the steps of:
   retrieving information regarding data packets that are sent to one of said control nodes and checking for a correspondence to one of a selection of known packet header types;
   investigating recognized data packet headers for indications to terminate an existing downlink communication connection; and
   terminating the radio connection part of said existing communication connection.

12. An apparatus in a radio communication system for channel type switching, said system comprising at least one control node which is connected to a number of Radio Base Stations each covering certain geographical areas and providing communication services to user equipment in said areas and providing connections to remote units in external networks, said arrangement comprising:
   means for retrieving information of data packets that are sent on the uplink from said user equipments or on the downlink from one of said remote units to one of said control nodes and means for checking for a correspondence to one of a selection of known packet header types in a record;
   means for investigating recognized data packet headers in either direction for traffic indications in order to make predictions of the expectable traffic in consequence of said recognized data packet headers and
   means for performing a channel type switching to an appropriate channel type comprising appropriate channel parameter settings on basis of investigated traffic indications.

13. The apparatus according to claim 12, further comprising means for checking reported traffic restrictions and initiating possible restriction measures for a downlink communication connection to be established on basis of the traffic indications that have been received on the uplink.

14. The arrangement according to claim 12, wherein the control node consists of a Radio Network Controller in a WCDMA-based radio communication system.

15. An apparatus in a radio communication system for channel type switching, said system comprising at least one control node which is connected to a number of Radio Base Stations each covering certain geographical areas and providing communication services to user equipment in said areas and providing connections to remote units in external networks, said apparatus comprising:
   means for retrieving information of data packets to one of said control nodes and means for checking for a correspondence to one of a selection of known packet header types in a record; and
   means for investigating recognized data packet headers, which comprise requests to terminate a communication connection, means for terminating the radio connection part of said existing communication connection.

16. The apparatus according to claim 15, wherein the control node consists of a Radio Network Controller in a WCDMA-based radio communication system.

* * * * *